(12) United States Patent
Fukazawa et al.

(10) Patent No.: US 11,536,583 B2
(45) Date of Patent: Dec. 27, 2022

(54) INFORMATION DISPLAY DEVICE, CONTROL METHOD, AND STORAGE MEDIUM

(71) Applicant: TOYOTA JIDOSHA KABUSHIKI KAISHA, Toyota (JP)

(72) Inventors: Kazuhiro Fukazawa, Miyoshi (JP); Michio Ikeda, Nagoya (JP); Tomoaki Miyazawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 343 days.

(21) Appl. No.: 16/872,480

(22) Filed: May 12, 2020

(65) Prior Publication Data
US 2020/0393264 A1  Dec. 17, 2020

(30) Foreign Application Priority Data
Jun. 12, 2019  (JP) .............................. JP2019-109629

(51) Int. Cl.
*G01C 21/36* (2006.01)
*G06V 20/58* (2022.01)

(52) U.S. Cl.
CPC .......... *G01C 21/367* (2013.01); *G06V 20/58* (2022.01)

(58) Field of Classification Search
CPC .. G01C 21/367; G01C 21/3602; G06V 20/58; G06V 10/25; G02B 2027/0138; G02B 2027/014; G02B 2027/0141; B60R 1/00; G08G 1/167; G06T 7/70
See application file for complete search history.

(56) References Cited

U.S. PATENT DOCUMENTS

2017/0187963 A1* 6/2017 Lee .................. G06V 20/56

FOREIGN PATENT DOCUMENTS

JP        2016-161483 A       9/2016

* cited by examiner

*Primary Examiner* — Nicholas Kiswanto
*Assistant Examiner* — Renee LaRose
(74) *Attorney, Agent, or Firm* — Oliff PLC

(57) ABSTRACT

An information display device includes: a display section that displays a view of a situation ahead of a vehicle and guidance information; a learning section that classifies and learns targets appearing on a travel route and visible through the display section as: a first target necessary to be visible, a second target necessary to be visible under the setting condition, or a third target not necessary to be visible, and a display control section configured to: prohibit display of the guidance information in a prohibited region with the first target, permit display of the guidance information in a permitted region with the third target, and either prohibit display of the guidance information in a conditional region with the second target and the setting condition is met, or permit display of the guidance information in the conditional region with the second target and the setting condition is not met.

8 Claims, 11 Drawing Sheets

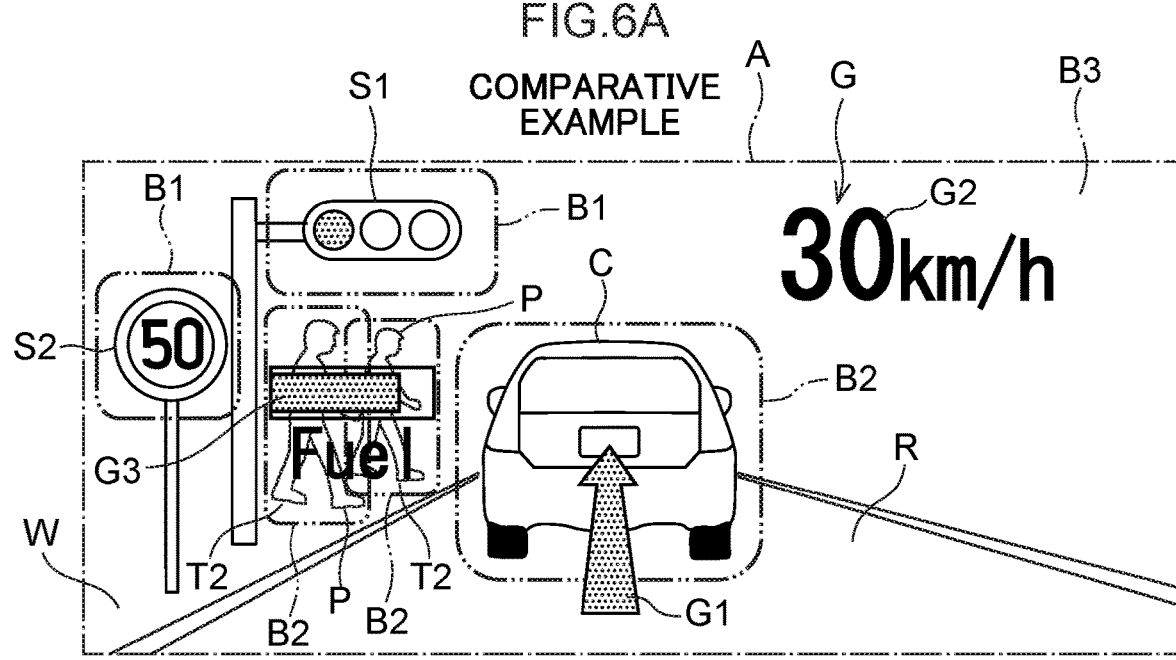

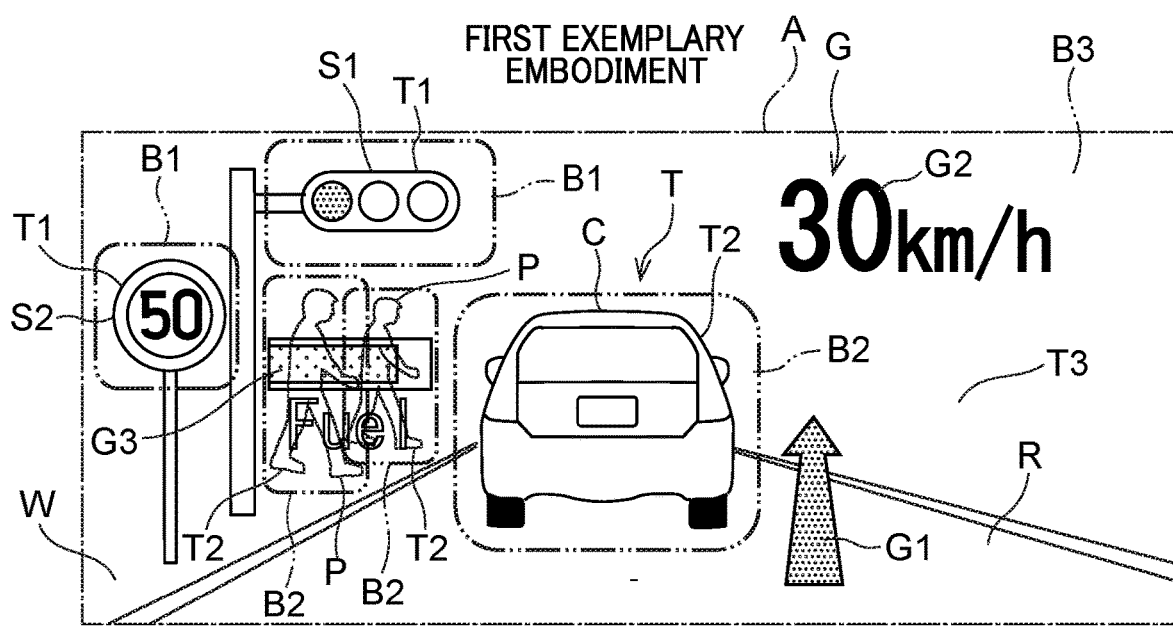

INFORMATION DISPLAY DEVICE, CONTROL METHOD, AND STORAGE MEDIUM

CROSS-REFERENCE TO RELATED APPLICATION

This application is based on and claims priority under 35 USC 119 from Japanese Patent Application No. 2019-109629 filed on Jun. 12, 2019, the disclosure of which is incorporated by reference herein.

BACKGROUND

Technical Field

The present disclosure relates to an information display device, a control method of the information display device, and a storage medium.

Related Art

Japanese Patent Application Laid-Open (JP-A) No. 2016-161483 discloses an information providing device in which a guidance image required for driving is displayed in a low appearance region selected from an overall predetermined road segment.

However, in the configuration of JP-A No. 2016-161483, although the information required for driving includes nearby vehicles and pedestrians near to the road, a vehicle is not always present in front and pedestrians will not always cross the road. Thus, permanently excluding regions where a vehicle in front or a pedestrian might be present from a guidance information display region more constrains the display region of the guidance information more than necessary, and there is therefore room for improvement.

SUMMARY

In consideration of the above circumstances, the present disclosure provides an information display device, a control method of the information display device, and a storage medium capable of suppressing a guidance information display region from being constrained more than necessary in a configuration including a display section that displays the guidance information.

An information display device according to a first aspect of the present disclosure includes a display section that is provided to a vehicle, and that is configured capable of displaying a view of a situation ahead of the vehicle to be viewed and displaying guidance information; a learning section configured to classify and learn targets appearing on a travel route of the vehicle and visible through the display section as: a first target that is necessary to be visible regardless of a setting condition, a second target that is necessary to be visible under the setting condition, or a third target that is not necessary to be visible, and a display control section configured to perform control to: prohibit display of the guidance information in a prohibited region of the display section in which the first target is present, permit display of the guidance information in a permitted region of the display section in which the third target is present, and either prohibit display of the guidance information in a conditional region of the display section in which the second target is present in a case in which the setting condition is met, or permit display of the guidance information in the conditional region of the display section in which the second target is present in a case in which the setting condition is not met.

In the present aspect, the learning section classifies and learns the targets appearing on the travel route as the first target that has to be visible regardless of the setting condition, the second target that has to be visible under the setting condition, or the third target that does not have to be visible. The display control section performs control to prohibit display of the guidance information in the prohibited region of the display section, and to permit display of the guidance information in the permitted region of the display section. The display control section also performs control to either prohibit display of the guidance information in the conditional region of the display section in cases in which the setting condition for the second target is met or to permit display of the guidance information in the conditional region of the display section in cases in which the setting condition is not met. Since display of the guidance information in the conditional region in which the second target is present is permitted in cases in which the setting condition is not met, greater than necessary constraint on the display region of the guidance information may be suppressed compared to configurations in which the display of guidance information in the conditional region is always prohibited.

The present aspect may be configured wherein the display control section is configured to perform control to reposition display of the guidance information from the conditional region to the permitted region in a case in which the conditional region continues in a next segment of the travel route.

In the above aspect, guidance information that is prohibited from being displayed in the conditional region is displayed in the permitted region. Thus, there are not likely to be periods during which the guidance information is not displayed on the display section, thereby enabling an occupant of the vehicle to be suppressed from being concerned by the absence of the guidance information.

The present aspect may be configured wherein the display section is configured capable of changing a display transparency level of the guidance information, and the display control section is configured to, in a case in which the conditional region will no longer be present in a next segment of the travel route, perform control to display the guidance information in the conditional region with the display transparency level of the guidance information raised in comparison to the display transparency level of the guidance information when displayed in the next segment of the travel route.

In the above aspect, in cases in which the conditional region will no longer be present in the next segment of the travel route, the guidance information is displayed in the conditional region with a high display transparency level. Thus, the guidance information is still displayed at the same location of the display section even though the region where the guidance information is being displayed becomes the conditional region, thereby enabling an occupant of the vehicle to view the guidance information without altering their gaze. Note that since the conditional region will no longer be present in the next segment of the travel route, driving of the vehicle is unaffected even though the guidance information continues to be displayed at the same location.

The present aspect may be configured wherein the learning section may be configured to additionally learn time-of-day information indicating a time when at least the second target appears, and a reduced frequency time-of-day indicating a time when a frequency of appearance of the second target is reduced compared to the frequency of appearance of the second target at other times of day, the reduced frequency time-of-day being included in a condition for a case in which the setting condition is not met; and the display control section is configured to perform control to permit display of the guidance information in the conditional region at the reduced frequency time-of-day.

In the above aspect, the display of guidance information in the conditional region is permitted at the reduced frequency time-of-day when the appearance frequency of the second target is reduced. The appearance frequency of the second target in the conditional region is reduced compared to other times of day. Thus, even if guidance information is displayed in the conditional region, the guidance information is not liable to obstruct the view and has little effect on driving. In this way, not only the permitted region but also the conditional region may be employed as display regions for the guidance information, thereby enabling an efficient expansion of the region in which the guidance information may be displayed compared to configurations in which the appearance frequency of the target is not taken into account.

A second aspect of the present disclosure is a control method of an information display device including a display section provided to a vehicle and configured capable of displaying a view of a situation ahead of the vehicle and displaying guidance information, the control method including: leaning and classifying targets appearing on a travel route of the vehicle and visible through the display section as a first target that is necessary to be visible regardless of a setting condition, a second target that is necessary to be visible under the setting condition, or a third target that is not necessary to be visible; and performing display control that includes: prohibiting display of the guidance information on the display section in a prohibited region of the display section in which the first target is present, permitting display of the guidance information on the display section in a permitted region of the display section in which the third target is present, and either prohibiting display of the guidance information in a conditional region of the display section in which the second target is present in a case in which the setting condition is met, or permitting display of the guidance information in the conditional region in a case in which the setting condition is not met.

A third aspect of the present disclosure is a non-transitory storage medium storing a program that causes a computer to execute control processing of an information display device, the information display device including a display section provided to a vehicle and configured capable of displaying a view of a situation ahead of the vehicle and displaying guidance information, the control processing including: learning and classifying targets appearing on a travel route of the vehicle and visible through the display section as: a first target that is necessary to be visible regardless of a setting condition, a second target that is necessary to be visible under the setting condition, or a third target that is not necessary to be visible; and performing display control including: prohibiting display of the guidance information on the display section in a prohibited region of the display section in which the first target is present, permit displaying of the guidance information on the display section in a permitted region of the display section in which the third target is present, and either prohibiting display of the guidance information in a conditional region of the display section in which the second target is present in a case in which the setting condition is met, or permitting display of the guidance information in the conditional region in a case in which the setting condition is not met.

As described above, the present disclosure is capable of suppressing a guidance information display region from being constrained more than necessary in a configuration including a display section that displays the guidance information.

BRIEF DESCRIPTION OF THE DRAWINGS

Exemplary embodiments of the present invention will be described in detail based on the following figures, wherein:

FIG. 6A is an illustration of a state in which guidance information is displayed on a front windshield in a comparative example;

FIG. 6B is an illustration of a state in which guidance information is displayed on a front windshield in the first exemplary embodiment;

DETAILED DESCRIPTION

First Exemplary Embodiment

Figure 1:
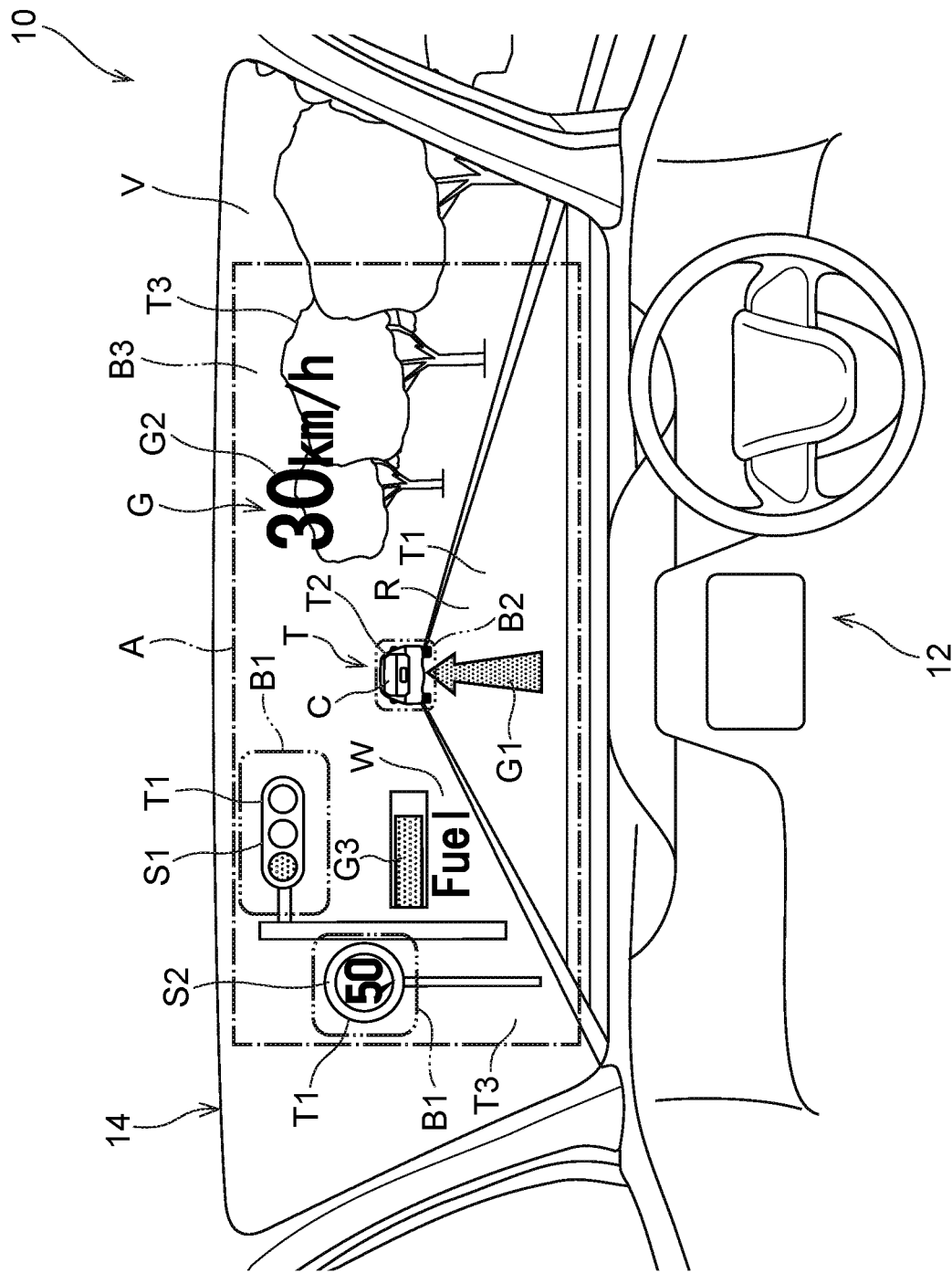
FIG. 1 is an illustration of an example of a view seen by an occupant through a front windshield of a vehicle applied with an information display device according to a first exemplary embodiment.

FIG. 1 illustrates a forward view V in a state viewed from inside a vehicle cabin 12 of a vehicle 10 applied with an information display device 20 (see FIG. 2) according to a first exemplary embodiment. The vehicle 10 includes a front windshield 14 and the information display device 20. In the following explanation, the front windshield 14 is referred to as the front glass 14.

A virtual region of the front glass 14 in which guidance information (display information) G is displayed using an HUD unit 32 (see FIG. 2), described later, is referred to as a potential display region A. A line indicating the outer periphery of the potential display region A is depicted by a single-dotted dashed line in FIG. 1. Although not visible in reality, the respective regions described below are illustrated by phantom lines in order to facilitate understanding of the positions of the respective regions.

As an example, FIG. 1 illustrates a travel route R (traffic lane) of the vehicle 10, a sidewalk W, a leading vehicle C, a traffic signal S1, and a speed sign S2 within the view V. The guidance information described later, is displayed within the potential display region A. The leading vehicle C, the traffic signal S1, and the speed sign S2 are illustrated within the potential display region A.

Explanation follows regarding the information display device 20.

Hardware Configuration

Figure 2:
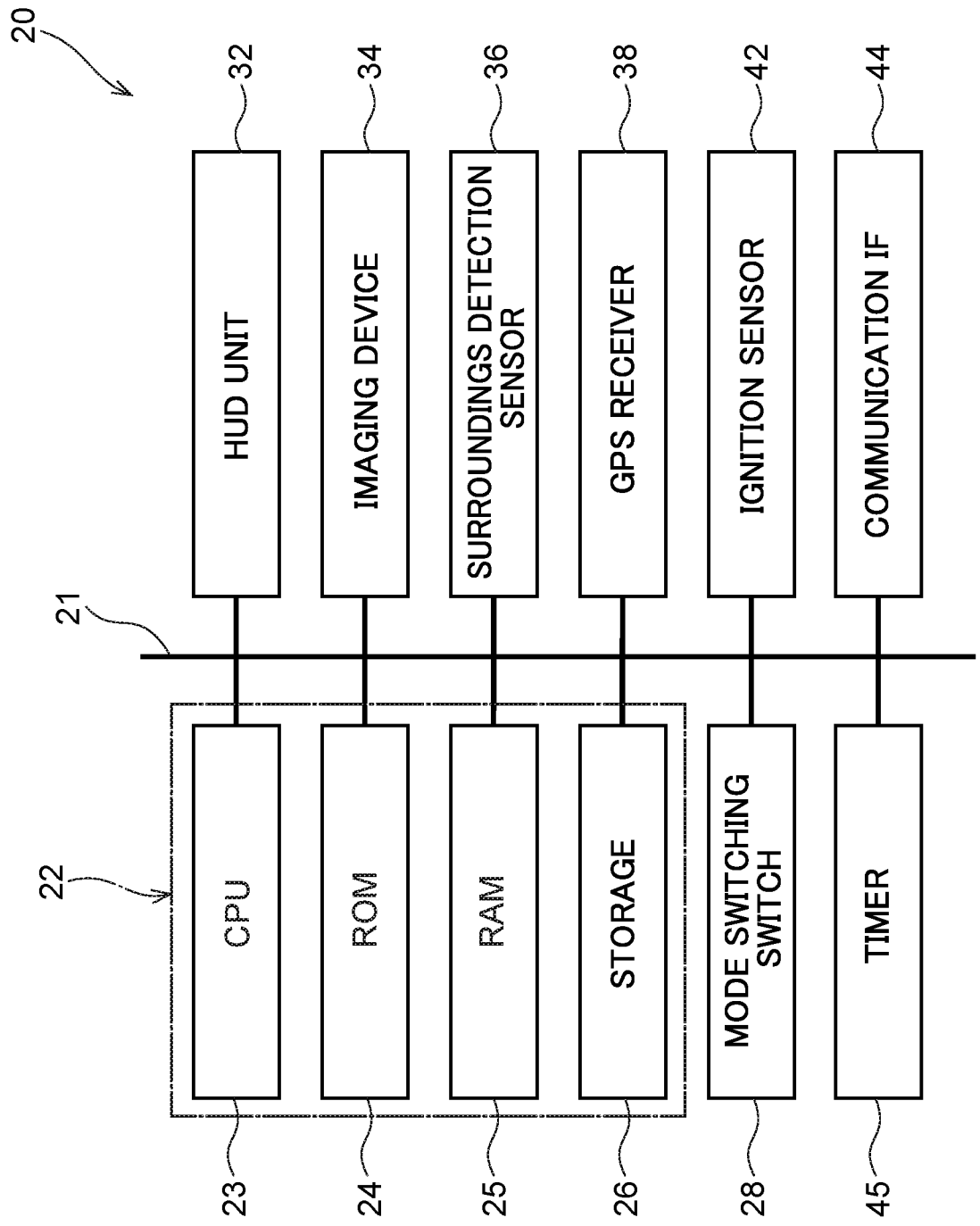
FIG. 2 is a block diagram illustrating a hardware configuration of an information display device according to the first exemplary embodiment.

As illustrated in FIG. 2, the information display device 20 includes an electronic control unit (ECU) 22, a mode switching switch 28, the head up display (HUD) unit 32, an imaging device 34, a surroundings detection sensor 36, a global positioning system (GPS) receiver 38, an ignition sensor 42, a communication interface (IF) 44, and a timer 45. These configurations are connected together so as to be capable of communicating with each other through an internal bus 21.

The ECU 22 includes a central processing unit (CPU) 23, a read only memory (ROM) 24, a random access memory (RAM) 25, and a storage 26.

The CPU 23 is a central processing unit, and executes various programs corresponding to a learning mode and a display mode, described later, to control operation of each section of the information display device 20. The ROM 24 holds various programs and various information (data). The RAM 25 serves as a workspace that temporarily stores programs and data. The storage 26 is configured, for example, by flash read only memory (ROM), and stores various programs including an operating system, and various data. The CPU 23 controls the respective configurations and performs various processing, described later, according to the various programs stored in the ROM 24 and the storage 26.

The mode switching switch 28 is operated by an occupant (driver) of the vehicle 10 (see FIG. 1) in order to switch between the learning mode and the display mode, described later. Information indicating whether the mode switching switch 28 is in an ON state or an OFF state is sent to the ECU 22. The ECU 22 is set to the display mode in cases in which the mode switching switch 28 is OFF, and the ECU 22 is set to the learning mode in cases in which the mode switching switch 28 is ON, for example. Note that configuration may be made so as to switch to the learning mode automatically, without employing the mode switching switch 28, when traveling along the travel route R for the first time.

As an example, the HUD unit 32 is configured by a laser scanning unit including a non-illustrated laser light source and a mirror. The HUD unit 32 projects the guidance information described later, within the potential display region A (see FIG. 1) of the front glass 14. The HUD unit 32 is also capable of changing a transparency level of the guidance information for example, by changing a display pattern of the guidance information G to one of a solid pattern or a dotted pattern.

When the solid pattern is applied, the guidance information G is displayed in a solid (filled-in) state, such that the guidance information G is clearly visible to an occupant, whereas a target T (see FIG. 1) on which the guidance information G is superimposed in the view V is less visible to the occupant. When the dotted pattern is applied, there are spaces between the dots, such that the guidance information G is less visible to the occupant than when the solid pattern is applied, but the target T on which the guidance information G is superimposed in the view V is more visible to the occupant.

As an example, the imaging device 34 includes a charge coupled device (CCD) image sensor. The imaging device 34 captures images of targets T in the view V. Image information captured (acquired) by the imaging device 34 is stored in the storage 26. Note that the imaging device 34 may be configured by an imaging device with a separate purpose, such as a drive recorder.

As an example, the surroundings detection sensor 36 includes at least one of a distance sensor, an ultrasound sensor, a stereo camera, a monocular camera, or an infrared camera. The surroundings detection sensor 36 detects (acquires) information regarding the surroundings of the vehicle 10. Examples of a distance sensor include a millimeter-wave radar and laser imaging detection and ranging (LIDAR) that output a signal according to a distance between the vehicle and an object other than the vehicle. Note that the type of surroundings detection sensor 36 that is used may be changed according to environmental conditions around the vehicle 10, such as the brightness and the weather. Surroundings information detected by the surroundings detection sensor 36 is stored in the storage 26.

The GPS receiver 38 is configured to receive signals from plural non-illustrated satellites and use the difference between the arrival times of the signals to ascertain the position of the vehicle 10 based on GPS methodology. The position information of the vehicle 10 obtained by the GPS receiver 38 is stored in the storage 26.

The ignition sensor 42 detects whether a non-illustrated ignition switch of the vehicle 10 is in an ON state (activated state) or an OFF state (stopped state). Information regarding the ON or OFF state detected by the ignition sensor 42 is sent to the ECU 22.

The communication IF 44 is an interface enabling the vehicle 10 to communicate with other devices, and a protocol such as Ethernet®, a fiber distributed data interface (FDDI), or Wi-Fi® is employed therefor.

The timer 45 sends time-of-day (point in time) information to the ECU 22. The timer 45 is also configured so as to be capable of measuring the duration between two points in time under the instruction of the ECU 22. Duration information measured by the timer 45 is sent to the ECU 22.

Functional Configuration

The information display device 20 realizes various functions using the above-described hardware resources when various programs corresponding to the learning mode and the display mode are executed. Explanation follows regarding functional configurations realized by the information display device 20. Note that reference to the individual drawing numbers is sometimes omitted when describing the various configurations illustrated in FIG. 1 and FIG. 2.

Figure 3:
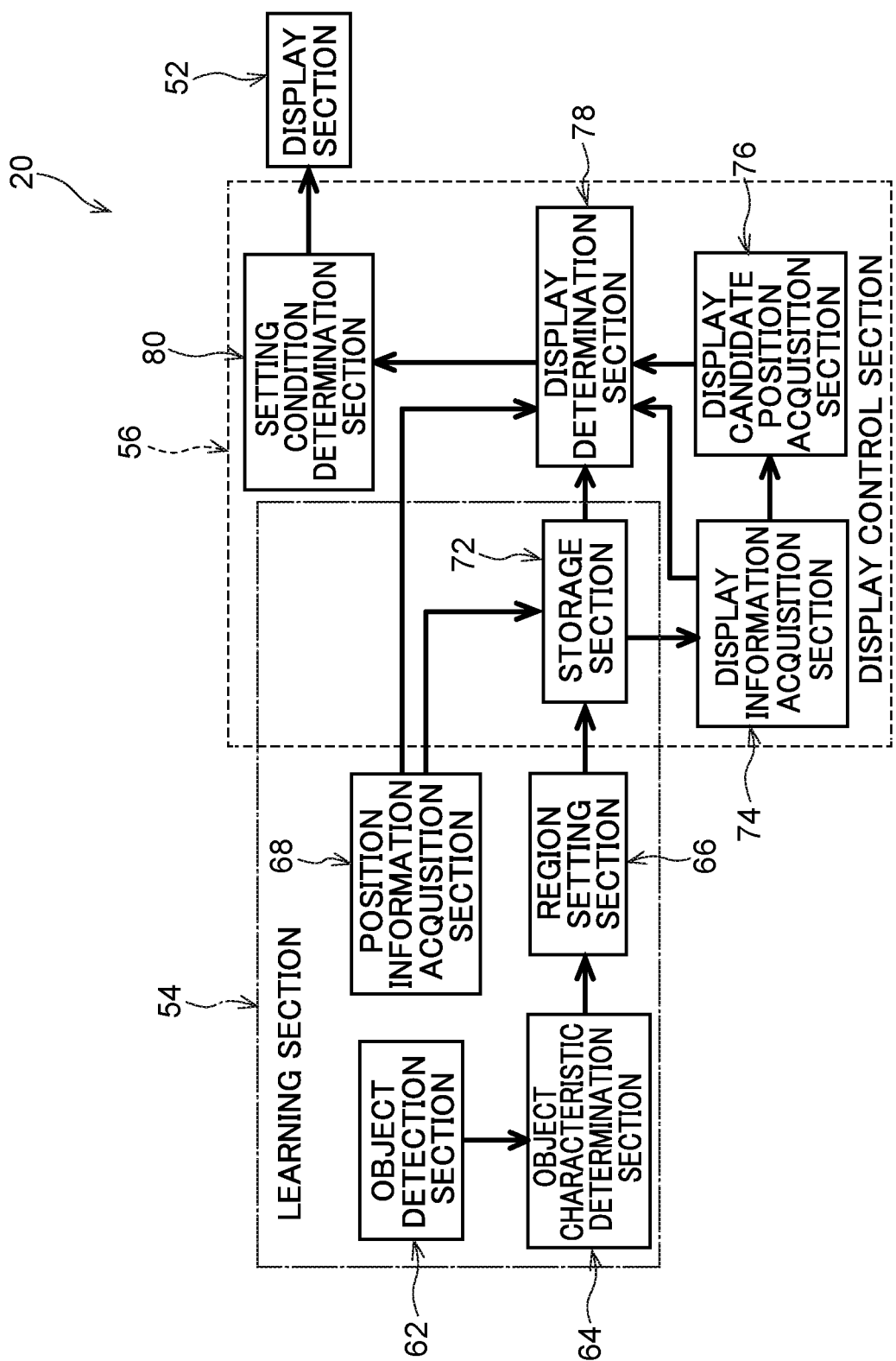
FIG. 3 is a block diagram illustrating functional configuration of the information display device illustrated in FIG. 2.

As illustrated in FIG. 3, the information display device 20 includes a display section 52, a learning section 54, and a display control section 56 as functional configurations. Each of the functional configurations is realized by the CPU 23 of the information display device 20 reading a program or information stored in the ROM 24 or the storage 26 and loading and executing this program or information in the RAM 25.

Display Section

The display section 52 includes the front glass 14 and the HUD unit 32. Namely, the display section 52 is provided to the vehicle 10, enables the situation ahead of the vehicle 10 (the view V) to be seen, and is capable of displaying the guidance information G Further, the display section 52 is provided so as to be capable of changing the display transparency level of the guidance information G by, for example, switching between the solid pattern and the dotted pattern previously described.

The guidance information G illustrated in FIG. 1 is set as display information to be referred to during driving when a non-illustrated occupant (driver) of the vehicle 10 is driving. In the present exemplary embodiment, direction of progress information G1, vehicle speed information G2, and remaining fuel level information G3 are provided as examples of the guidance information G The direction of progress information G1 is information provided from a non-illustrated navigation unit. An arrow is displayed as the direction in which the vehicle 10 should proceed in order for the vehicle 10 to reach its destination. The remaining fuel level information G3 displays the proportion of fuel currently remaining in the form of a bar chart in a rectangular frame corresponding to 100% remaining fuel.

Learning Section

The learning section 54 illustrated in FIG. 3 learns targets T, these being objects that appear on the travel route R of the vehicle 10 and are visible through the display section 52. Specifically, the learning section 54 categorizes the targets T into first targets T1 that have to be visible regardless of a setting condition, described later, second targets T2 that have to be visible under the setting condition, and third targets T3 that do not have to be visible, and learns them respectively. Namely, the learning mode refers to a mode in which each target T is categorized and learnt as either a first target T1, a second target T2, or a third target T3. The display mode refers to a mode in which the display of guidance information G on the front glass 14 is controlled based on the result of the learning performed in the learning mode.

The first targets T1 include the travel route R, the traffic signal S1, and the speed sign S2 illustrated in FIG. 1. The second targets T2 include the leading vehicle C and pedestrians P (see FIG. 6B). The third targets T3 include the sidewalk W, roadside trees, and non-illustrated buildings and the like. The setting condition relating to the second targets T2 is pre-set in a storage section 72 (see FIG. 3) of the learning section 54, described later.

Note that the setting condition relating to the second targets T2 of the present exemplary embodiment is met when it is assumed that a second target T2 will be present in the next segment of the travel route R. In other words, the setting condition is a condition of a conditional region B2, described later, still being present as a conditional region B2 in the next segment of the travel route R. Note that the next segment refers to a travel segment of the travel route R that is ahead of the current travel segment of the vehicle 10 by a set distance (corresponding to a set duration elapsing).

More specific explanation follows regarding configuration of the learning section 54 illustrated in FIG. 3. The learning section 54 includes, for example, an object detection section 62, an object characteristic determination section 64, a region setting section 66, a position information acquisition section 68, and the storage section 72.

The object detection section 62 detects targets T as objects based on information acquired by the imaging device 34 and the surroundings detection sensor 36 (see FIG. 2), and a known algorithm (such as a neural network, decision tree, pattern matching, or the like). The information acquired by the object detection section 62 is sent to the object characteristic determination section 64.

The object characteristic determination section 64 determines whether each of the targets T detected by the object detection section 62 is a fixed object with a fixed position (such as the traffic signal S1 and the speed sign S2), or a moving object (such as the pedestrians P and the leading vehicle C). As an example, pattern matching is employed to make this determination. Further, the object characteristic determination section 64 categorizes each of the detected targets T as a first target T1, a second target T2, or a third target T3. The information acquired by the object characteristic determination section 64 is sent to the region setting section 66.

The region setting section 66 sets prohibited regions B1, conditional regions B2, and a permitted region B3 (see FIG. 1 for all regions) according to the respective targets T present within the potential display region A (see FIG. 1). The prohibited region B1 is a region set where a first target T1 is present. The conditional region B2 is a region set where a second target T2 is present. The permitted region B3 is a region set where third targets T3 are present. Each of these regions takes into account detection error of the corresponding target T and the changing size of the target T accompanying movement of the vehicle 10, and is thus set as a region that is larger than the outer profile of the corresponding target T. Note that the prohibited regions B1, the conditional regions B2, and the permitted region B3 are virtual regions, and are not actually visible to an occupant. Information set by the region setting section 66 is sent to the storage section 72.

The position information acquisition section 68 acquires position information regarding the vehicle 10 from the GPS receiver 38 (see FIG. 2). The position information regarding the vehicle 10 acquired by the position information acquisition section 68 is sent to the storage section 72 and to a display determination section 78, described later.

As an example, the storage section 72 is configured by flash read only memory (ROM), similarly to the storage 26 (see FIG. 2). Information regarding the targets T, region information set by the region setting section 66, and position information acquired by the position information acquisition section 68 are stored in the storage section 72. In other words, learning results of the learning by the learning section 54 are stored in the storage section 72. The storage section 72 is also be utilized as part of the display control section 56, described later.

Display Control Section

The display control section 56 performs control to prohibit display of guidance information G in the prohibited regions B1 including the first targets T1, and to permit display of guidance information G in the permitted region B3 including the third targets T3. The display control section 56 also performs control so as to prohibit display of guidance information G in any conditional region B2 including a second target T2 that meets the previously described setting condition, and to permit display of guidance information G in any conditional region B2 including a second target T2 that does not meet the previously described setting condition.

In cases in which it is predicted that the conditional region B2 will still be present in the next segment of the travel route R (the segment immediately following the current travel segment), the display control section 56 performs control to reposition the guidance information G from the conditional region B2 to the permitted region B3. In cases in which it is not predicted that the conditional region B2 will still be present in the next segment of the travel route R, the display control section 56 performs control so as to increase the display transparency level of the guidance information G compared to the display transparency level at which the guidance information G will be displayed in the next segment of the travel route R, and displays the guidance information G in the conditional region B2.

More specific explanation follows regarding configuration of the display control section 56. As an example, the display control section 56 includes the storage section 72, a display information acquisition section 74, a display candidate position acquisition section 76, the display determination section 78, and a setting condition determination section 80.

As previously described, the storage section 72 is shared as the storage section 72 of the learning section 54. Region information regarding each region set by the region setting section 66, position information acquired by the position information acquisition section 68, and progress information including the speed of the vehicle 10 are stored associated with each other in the storage section 72. Each item of information in the storage section 72 is stored, for example, at every designated segments (such as a segment in which a preset number of traffic signals are present, a segment of a preset distance, a segment where the curvature of a curve in the travel route R has a predetermined curvature, or a segment with a predetermined gradient).

The display information acquisition section 74 acquires information to be displayed on the display section 52 from the storage section 72. Note that this information includes not only the guidance information G, but also map information relating to the travel route R, speed limit information, and the like. The information acquired by the display information acquisition section 74 is sent to the display candidate position acquisition section 76 and to the display determination section 78.

Display positions of the respective information (the guidance information G in this case) to be displayed on the display section 52 within the potential display region A are predetermined (stored) by the display candidate position acquisition section 76. Information regarding the display positions of the guidance information G in the display candidate position acquisition section 76 is then acquired by the display determination section 78.

As illustrated in FIG. 1, the display position of the direction of progress information G1 is a position (a substantially central portion) superimposed on the travel route R within the potential display region A. The display position of the vehicle speed information G2 is a position corresponding to an upper right portion within the potential display region A. The display position of the remaining fuel level information G3 is a position at the upper left of the direction of progress information G1.

The display determination section 78 illustrated in FIG. 3 determines whether or not display of the guidance information G is possible based on the position information of the vehicle 10 acquired from the position information acquisition section 68, the information regarding each region learnt by the learning section 54, and the position information of the guidance information G acquired from the display candidate position acquisition section 76. Specifically, the display determination section 78 determines whether planned display regions of the guidance information G within the potential display region A overlap with a prohibited region B1, a conditional region B2, or the permitted region B3. Respective determination results are sent to the setting condition determination section 80.

The setting condition determination section 80 permits (i.e., determines to permit) display of the guidance information G superimposed on the permitted region B3 with no change to the display state or the display position of the guidance information G The setting condition determination section 80 prohibits (i.e., determines to prohibit) display of the guidance information G where it would be superimposed on a prohibited region B1, regardless of the setting condition. The setting condition determination section 80 also prohibits display of the guidance information G where it would be superimposed on a conditional region B2 in cases in which the setting condition described previously is satisfied, and performs processing to reposition the guidance information G in the permitted region B3. In cases in which the setting condition is not satisfied, the setting condition determination section 80 permits display of the guidance information G in the conditional region B2, and performs processing to increase the display transparency level of the guidance information G The display section 52 controls operation of the HUD unit 32 to display the guidance information G appropriately within the potential display region A based on the determination results of the setting condition determination section 80. Thus, in the display mode of the information display device 20, display of the guidance information G is controlled based on the results of learning in the learning mode.

Comparative Example

FIG. 6A illustrates a comparative example to the present exemplary embodiment, in a state in which the remaining fuel level information G3 is superimposed on a region in which pedestrians P are present, and the direction of progress information G1 is superimposed on a region in which a leading vehicle C is present. In this comparative example, since part of the leading vehicle C is hidden by the direction of progress information G1, an occupant of the vehicle 10 might not notice if for example an object falls from the leading vehicle C in the hidden area. Moreover, since the pedestrians P are hidden by the remaining fuel level information G3 over a wide range, it might be more difficult to notice if the pedestrians P move onto the travel route R.

Operation and Effects

Explanation follows regarding operation of the information display device 20 of the first exemplary embodiment.

Figure 4:
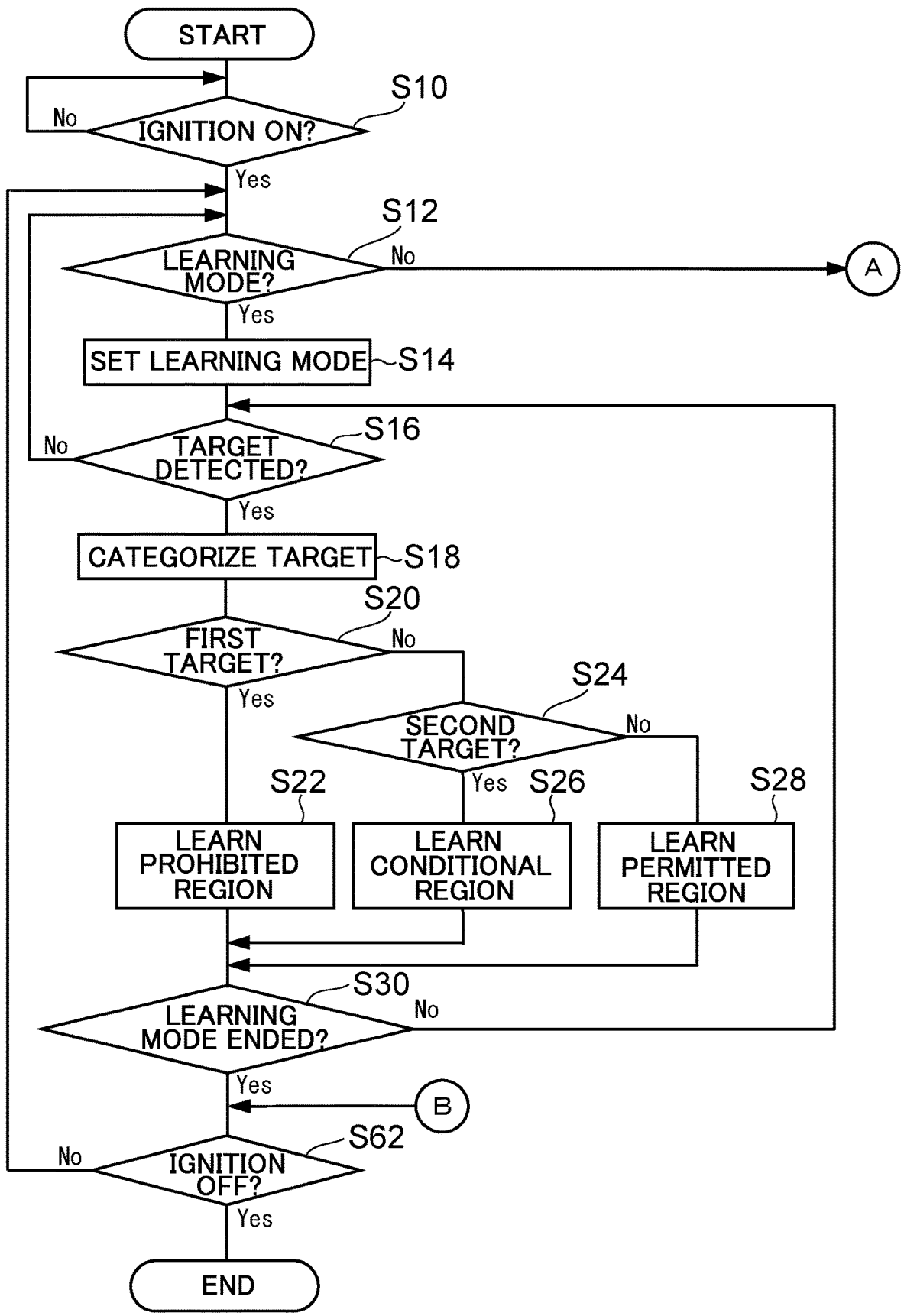
FIG. 4 is a flowchart primarily illustrating a flow of a learning processing element of guidance information display processing by the information display device illustrated in FIG. 3.
Figure 5:
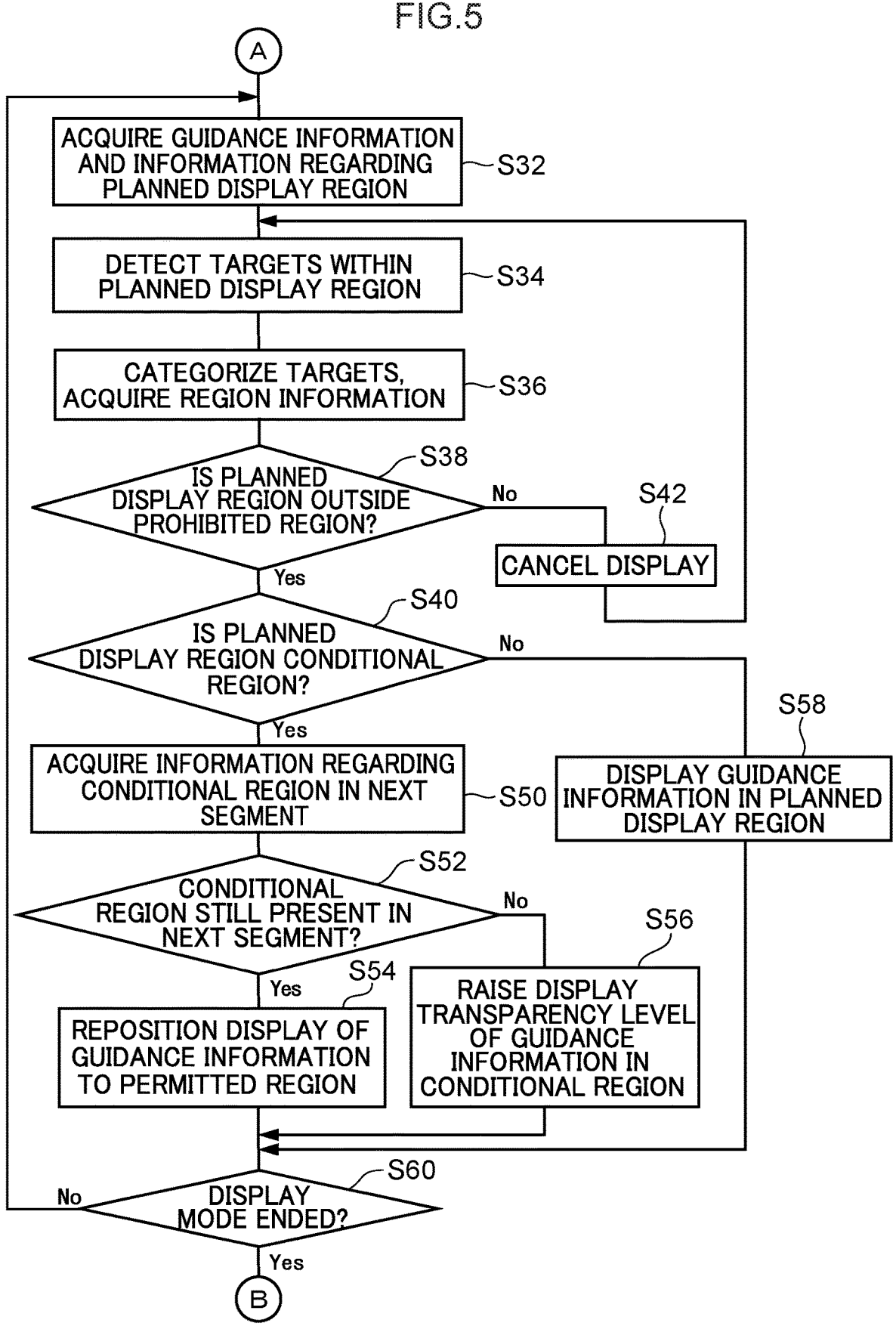
FIG. 5 is a flowchart primarily illustrating a flow of a display processing element of guidance information display processing by the information display device illustrated in FIG. 3.

FIG. 4 and FIG. 5 are flowcharts illustrating flows of display control processing (i.e., learning mode processing and display mode processing respectively) by the ECU 22 (see FIG. 2). Note that explanation regarding the respective sections of the vehicle 10 and the information display device 20 refers to FIG. 1 to FIG. 3, and individual references to the drawing numbers are omitted. The CPU 23 of the ECU 22 reads a program corresponding to the learning mode or the display mode from the ROM 24 or the storage 26, loads this program in the RAM 25 and executes the program to perform the learning mode control processing or the display mode control processing.

As previously described, switching between the learning mode and the display mode is performed by an occupant operating the mode switching switch 28. The connector A in FIG. 4 is linked to the connector A in FIG. 5, and the connector B in FIG. 4 is linked to the connector B in FIG. 5.

At step S10, the CPU 23 checks a signal detected by the ignition sensor 42 to determine whether or not the ignition is in an ON state. In cases in which the ignition is determined to be in an ON state (S10: Yes), processing transitions to step S12. In cases in which the ignition is determined to be in an OFF state (S10: No), the processing of step S10 is repeated.

At step S12, the CPU 23 checks information from the mode switching switch 28 to determine whether or not the learning mode has been selected. In cases in which the learning mode has been selected (S12: Yes), processing transitions to step S14. In cases in which the learning mode has not been selected, and the display mode has been selected (S12: No), processing transitions to step S32.

At step S14, the CPU 23 sets the learning mode, and starts processing in the learning mode. Processing then transitions to step S16.

At step S16, the CPU 23 determines whether or not a target T has been detected by the object detection section 62. In cases in which a target T has been detected (S16: Yes), processing transitions to step S18. In cases in which a target T has not been detected (S16: No), processing transitions to step S12.

At step S18, the CPU 23 uses the object characteristic determination section 64 to categorize the detected target T as one of a first target T1, a second target T2, or a third target T3. Processing then transitions to step S20.

At step S20, the CPU 23 determines whether or not the categorized target T is a first target T1. In cases in which the target T is a first target T1 (S20: Yes), processing transitions to step S22. In cases in which the target T is not a first target T1 (S20: No), processing transitions to step S24.

At step S22, the CPU 23 uses the region setting section 66 to set a virtual region including the first target T1 and a region surrounding the first target T1 as a prohibited region B1, and stores this setting in the storage section 72. In other words, a prohibited region B1 is learnt at step S22. Information regarding the position where the prohibited region B1 appears is also stored in the storage section 72 when this is performed. Processing then transitions to step S30.

At step S24, the CPU 23 determines whether or not the categorized target T is a second target T2. In cases in which the target T is a second target T2 (S24: Yes), processing transitions to step S26. In cases in which the target T is not a second target T2 (S24: No), processing transitions to step S28.

At step S26, the CPU 23 uses the region setting section 66 to set a virtual region including the second target T2 and a region surrounding the second target T2 as a conditional region B2, and stores this setting in the storage section 72. In other words, a conditional region B2 is learnt at step S26. Information regarding the position where the conditional region B2 appeared is also stored in the storage section 72 when this is performed. Processing then transitions to step S30.

At step S28, the CPU 23 uses the region setting section 66 to set a virtual region within the potential display region that does not overlap with prohibited regions B1 or conditional regions B2, and that includes any third targets T3, as the permitted region B3, and stores this setting in the storage section 72. In other words, the permitted region B3 is learnt at step S28. Processing then transitions to step S30.

At step S30, the CPU 23 determines whether or not the learning mode has ended based on whether or not any uncategorized targets T remain within the potential display region A. In cases in which the learning mode has ended (in cases in which no uncategorized targets T are present; S30: Yes), processing transitions to step S62. In cases in which the learning mode is ongoing (in cases in which an uncategorized target T is present: S30: No), processing transitions to step S16.

At step S32, the CPU 23 sets the display mode, and acquires the guidance information G and information (position information) regarding planned display regions of the guidance information G Processing then transitions to step S34.

At step S34, the CPU 23 uses the object detection section 62 to detect targets T within the planned display regions of the guidance information G Processing then transitions to step S36.

At step S36, the CPU 23 categorizes each target T within the planned display regions as a first target T1, a second target T2, or a third target T3, and acquires region information of the categorized targets T. For example, if the target T is a first target T1, information regarding a prohibited region B1 is acquired. Processing then transitions to step S38.

At step S38, the CPU 23 determines whether or not the planned display regions of the guidance information G are outside the prohibited regions B1, based on the region information regarding the categorized targets T. In cases in which a planned display region is outside the prohibited regions B1 (S38: Yes), processing transitions to step S40. In cases in which a planned display region corresponds to a prohibited region B1 (S38: No), processing transitions to step S42.

At step S40, the CPU 23 determines whether or not the planned display region of the guidance information G corresponds to a conditional region B2, based on the region information regarding the categorized targets T. In cases in which the planned display region corresponds to a conditional region B2 (S40: Yes), processing transitions to step S50. In cases in which the planned display region does not correspond to a conditional region B2 (in cases in which the planned display region is in the permitted region B3), processing transitions to step S58.

At step S42, the CPU 23 cancels display of the guidance information G on the planned display region. Processing then transitions to step S34.

At step S50, the CPU 23 acquires information regarding the region configuring the conditional region B2 in the next segment (the next segment of the travel route R). Processing then transitions to step S52.

At step S52, the CPU 23 determines whether or not the region configuring the conditional region B2 will still be present in the next segment. Determination as to whether or not the conditional region B2 will still be present in the next segment may for example be performed based on a probability of the second target T2 being present in the next segment. In cases in which the probability of the second target T2 being present is a predetermined probability, such as 50% or greater, the CPU 23 concludes that the conditional region B2 will still be present in the next segment. In cases in which the conditional region B2 will still be present in the next segment (S52: Yes), processing transitions to step S54. In cases in which the conditional region B2 will no longer be present in the next segment (S52: No), processing transitions to step S56.

At step S54, the CPU 23 repositions display of the guidance information G to the permitted region B3 in the vicinity of the region where the conditional region B2 will still be present. Processing then transitions to step S60.

At step S56, the CPU 23 raises the transparency level of the guidance information G and displays the guidance information G in the conditional region B2. Processing then transitions to step S60.

At step S58, the CPU 23 displays the guidance information G in the planned display region (the permitted region B3). Processing then transitions to step S60.

At step S60, the CPU 23 checks whether or not the mode switching switch 28 is still in the display mode. In cases in which there has been a switch to the learning mode, determination is made that the display mode has ended and processing transitions to step S62. In cases in which the mode switching switch 28 is still switched to the display mode, determination is made that the display mode is still ongoing, and processing transitions to step S32.

At step S62, the CPU 23 determines whether or not the ignition is in an OFF state. In cases in which the ignition is determined to be in an OFF state (S62: Yes), the program is ended. In cases in which the ignition is determined to be in an ON state (S62: No), processing transitions to step S12.

FIG. 6B illustrates an example of a display state of guidance information G in the first exemplary embodiment. Note that although not visible in reality, the respective regions are indicated by phantom lines in order to facilitate understanding of the positions of the respective regions. Regions including the traffic signal S1 and the speed sign S2 are set as prohibited regions B1. Regions including the leading vehicle C and the pedestrians P are set as conditional regions B2. Regions other than the prohibited regions B1 and the conditional regions B2 are set as the permitted region B3.

The conditional regions B2 where the pedestrians P are present are determined to be conditional regions B2 that will not be present in the next segment, and so the remaining fuel level information G3 is displayed superimposed on the pedestrians P in a state in which the transparency level of the remaining fuel level information G3 is greater than the transparency level thereof during normal display. Namely, since these conditional regions B2 will not be present in the next segment of the travel route R, there is no issue with the remaining fuel level information G3 being displayed at the same location.

Since determination is made that the conditional region B2 where the leading vehicle C is present will still be present as a conditional region B2 in the next segment of the travel route R, display of the direction of progress information G1 is repositioned to the permitted region B3 in the vicinity of the conditional region B2 (for example, to a region to the right of the leading vehicle C). The direction of progress information G1 is also displayed in the repositioned state with respect to the leading vehicle C in the next segment.

As explained above, in the information display device 20, the learning section 54 learns the targets T appearing on the travel route R discriminated into first targets T1 that have to be visible regardless of the setting condition, second targets T2 that have to be visible under the setting condition, and third targets T3 that do not have to be visible. The display control section 56 performs control to prohibit the display of guidance information G in prohibited regions B1 of the display section 52, and to permit display of guidance information G in the permitted region B3 of the display section 52. The display control section 56 also performs control to prohibit the display of guidance information G in a conditional region B2 of the display section 52 in cases in which the corresponding second target T2 meets the setting condition, and to permit display of guidance information G in a conditional region B2 of the display section 52 in cases in which the corresponding second target T2 does not meet the setting condition. Thus, display of the guidance information G in a conditional region B2 is permitted in cases in which the setting condition is not met, thereby enabling greater than necessary constraint on the display region of the guidance information G to be suppressed compared to configurations in which the display of guidance information G in conditional regions B2 is always prohibited.

Moreover, in the information display device 20, guidance information G that is prohibited from being displayed in a conditional region B2 is repositioned and displayed in the permitted region B3. Thus, there are not likely to be periods during which the guidance information G is not displayed on the display section 52, thereby enabling the occupant of the vehicle 10 to be suppressed from being concerned by the absence of the guidance information G.

Further, in the information display device 20, in cases in which a conditional region B2 will no longer be present in the next segment of the travel route R, the guidance information G is displayed in the conditional region B2 with a high display transparency level. Thus, the guidance information G is still displayed at the same location of the display section 52 even though the region where the guidance information G is being displayed is a conditional region B2, thereby enabling an occupant of the vehicle 10 to view the guidance information G without altering their gaze. In such cases, since the conditional region B2 will no longer be present in the next segment of the travel route R, driving of the vehicle 10 is unaffected even though the guidance information G continues to be displayed at the same location.

Second Exemplary Embodiment

Explanation follows regarding an information display device 90 according to a second exemplary embodiment.

Figure 7:
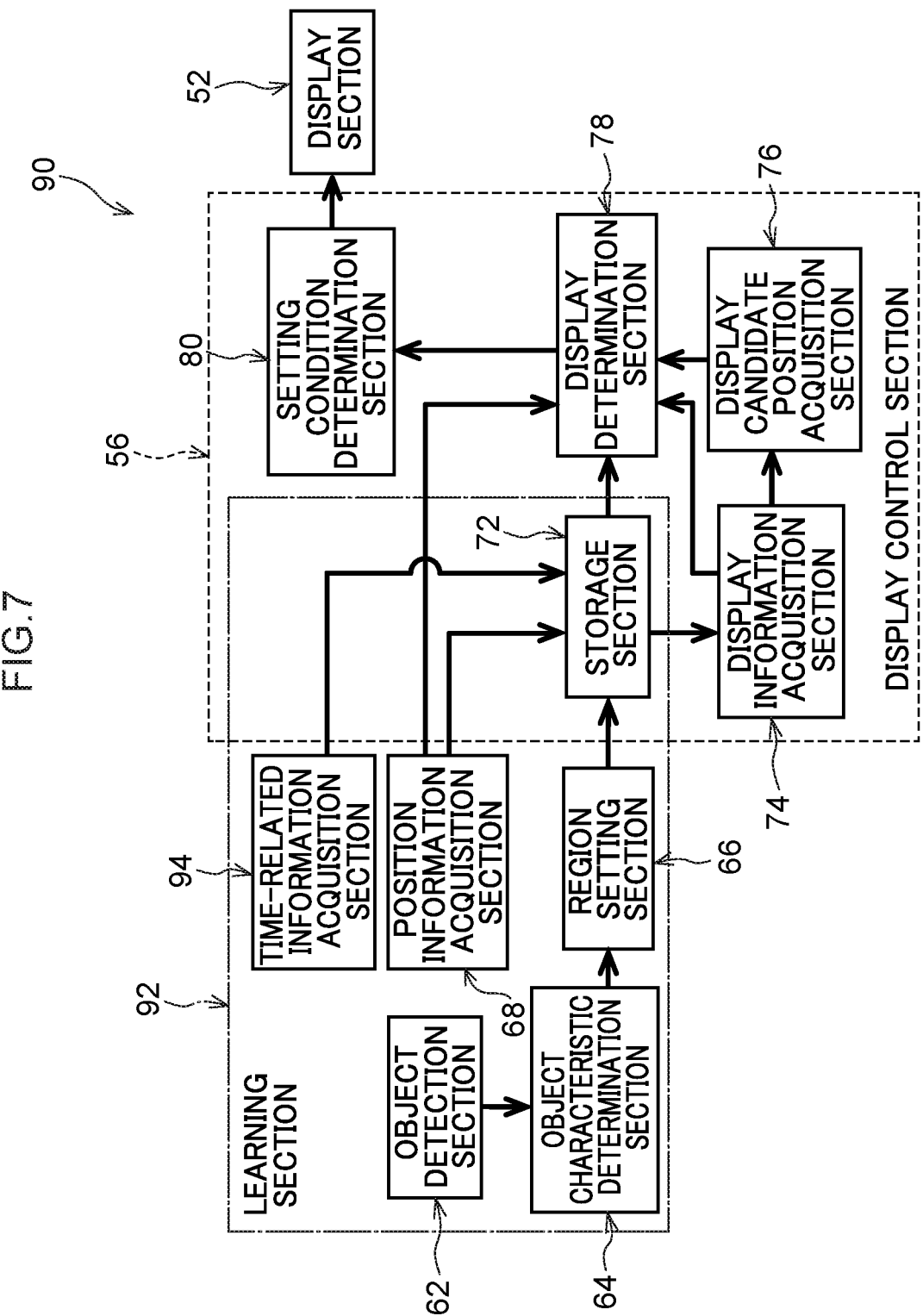
FIG. 7 is a block diagram illustrating functional configuration of an information display device according to a second exemplary embodiment.

The information display device 90 illustrated in FIG. 7 is provided to the vehicle 10 (see FIG. 1) of the first exemplary embodiment instead of the information display device 20 (see FIG. 3). Note that configurations that are basically the same as those of the vehicle 10 and the information display device 20 of the first exemplary embodiment are allocated the same reference numerals and explanation thereof is omitted.

The information display device 90 includes the display section 52, a learning section 92, and the display control section 56. The learning section 92 differs from the learning section 54 (see FIG. 3) in that a time-related information acquisition section 94 is added. The time-related information acquisition section 94 acquires time-of-day information and duration information from the timer 45 (see FIG. 2).

The learning section 92 learns at least the second targets T2 (see FIG. 6B) together with time-of-day information regarding an appearance timing at which the second target T2 appears. The learning section 92 also learns (derives) a reduced frequency time-of-day, this being a certain time of day when an appearance frequency of the second target T2 is lower than the appearance frequency of the second target T2 at other times of day. Further, in the learning section 92, the reduced frequency time-of-day is included as a condition for cases in which the previously described setting condition is not met.

In the present exemplary embodiment, the appearance frequency refers to the number of target T appearances per unit time within a preset region. The reduced frequency time-of-day is not a point in time at which the appearance frequency is reduced, but rather a concept of a period of time including a duration of a preset length before and after a point in time and centered on this point in time. In the second exemplary embodiment as an example, pedestrians P are set as second targets T2 for which the appearance frequency drops.

A program is preset such that the display control section 56 performs control to permit display of guidance information G in a conditional region B2 during the above-described reduced frequency time-of-day. Note that the display control section 56 of the second exemplary embodiment differs from that of the first exemplary embodiment in the respect that the display of guidance information G in a conditional region B2 is permitted when the appearance frequency of a target T in the conditional region B2 is low.

Operation and Effects

Explanation follows regarding operation of the information display device 90 of the second exemplary embodiment.

Figure 8:
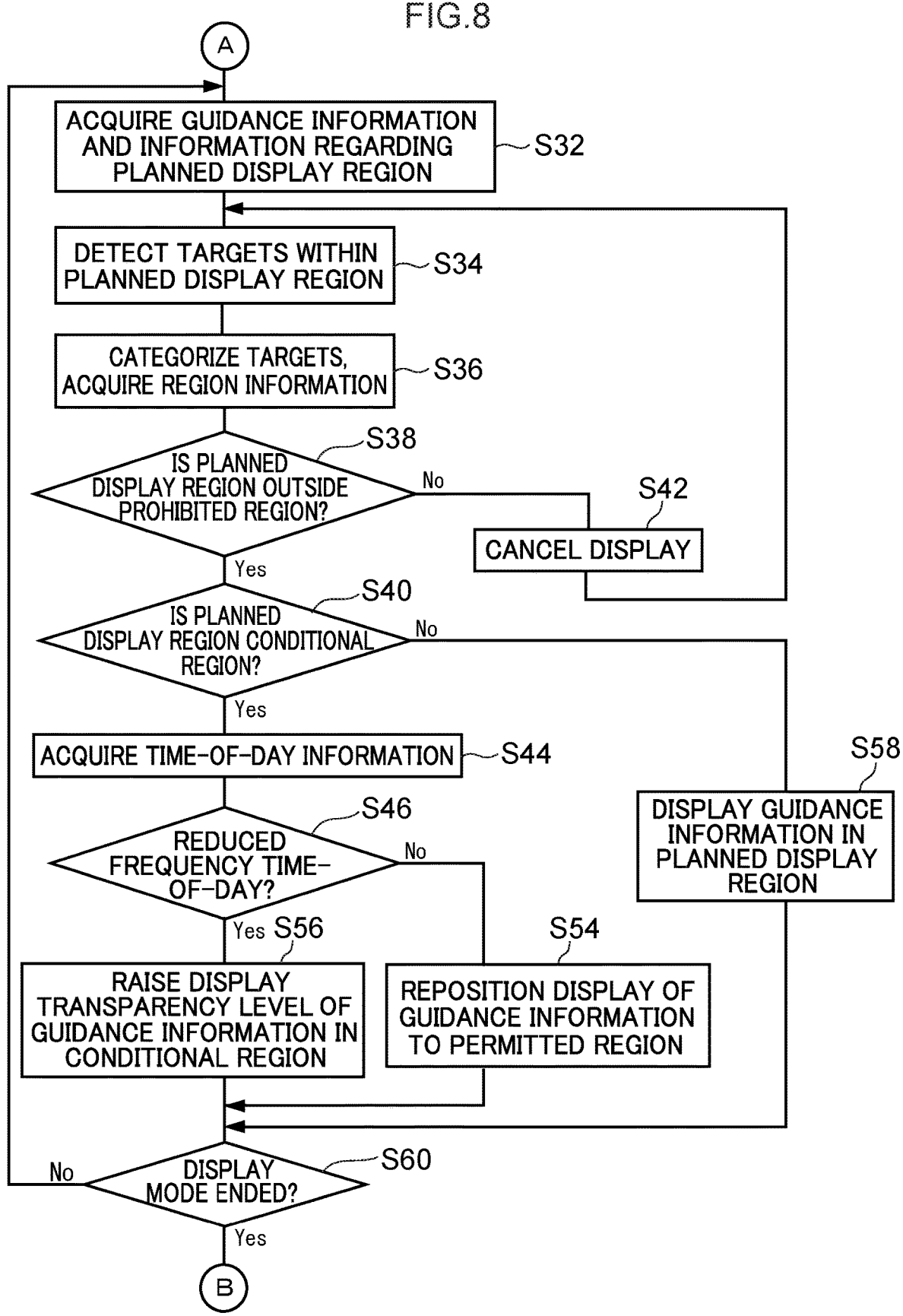
FIG. 8 is a flowchart primarily illustrating a flow of a display processing element of guidance information display processing by an information display device according to the second exemplary embodiment.

FIG. 8 illustrates part of a flowchart illustrating a flow of display control processing (in the display mode) of the second exemplary embodiment by the ECU 22 (see FIG. 2). Note that explanation regarding the respective sections of the vehicle 10 and the information display device 90 refers to FIG. 1, FIG. 2, and FIG. 7, and individual references to the drawing numbers are omitted. Processing similar to that of the first exemplary embodiment is allocated the same reference numerals as in the first exemplary embodiment, and explanation thereof is omitted. The connector A in FIG. 8 is linked to the connector A in FIG. 4, and the connector B in FIG. 8 is linked to the connector B in FIG. 4.

After having transitioned from step S40 to step S44, the CPU 23 acquires time-of-day information from the time-related information acquisition section 94. Processing then transitions to step S46.

At step S46, the CPU 23 determines whether or not the current time corresponds to a reduced frequency time-of-day. In cases in which the current time corresponds to a reduced frequency time-of-day (S46: Yes), processing transitions to step S56, and the guidance information G is displayed in the conditional region B2 with an increased transparency level. In cases in which the current time does not correspond to a reduced frequency time-of-day (S46: No), processing transitions to step S54. Other steps are similar to those of the first exemplary embodiment.

Figure 9:
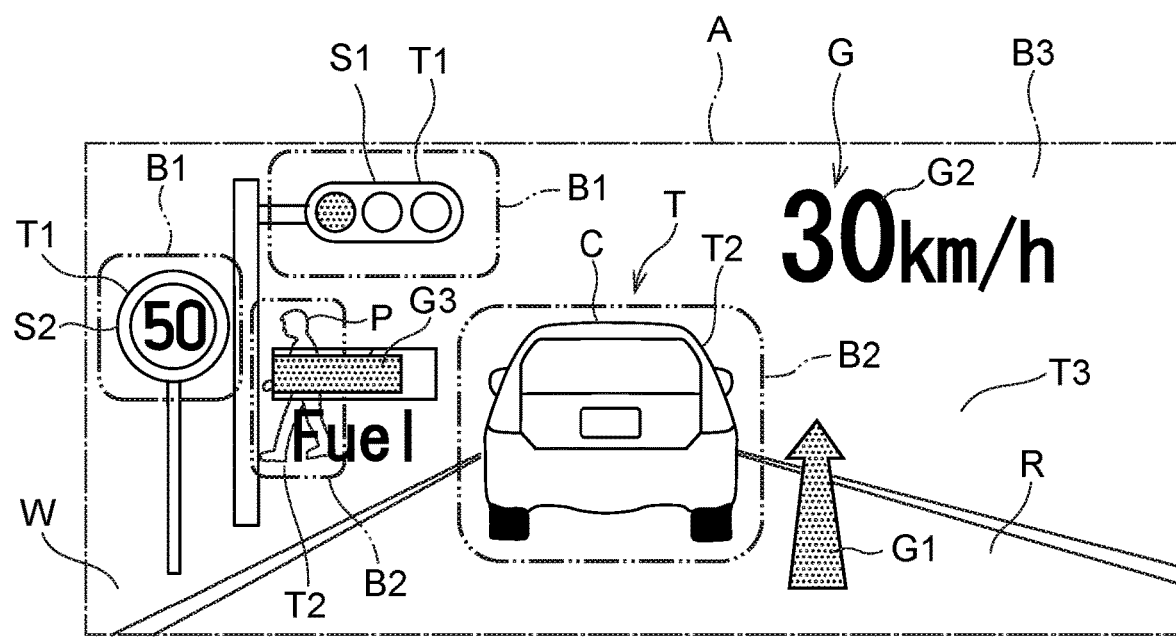
FIG. 9 is an illustration of a state in which guidance information is displayed on a front windshield using an information display device according to the second exemplary embodiment.

FIG. 9 illustrates an example of a display state of guidance information G in the second exemplary embodiment. The direction of progress information G1 display has been repositioned from the conditional region B2 where the leading vehicle C is present to the permitted region B3. Since the time is a reduced frequency time-of-day when the appearance frequency of pedestrians P is low, the remaining fuel level information G3 is displayed superimposed on the pedestrian P in the conditional region B2 where the pedestrian P is present.

As explained above, in the information display device 90, the display of guidance information G in a conditional region B2 corresponding to a second target T2 with a reduced appearance frequency is permitted at a reduced frequency time-of-day when the appearance frequency of second targets T2 is reduced. The appearance frequency of second targets T2 in the conditional region B2 where the pedestrian P is present is reduced compared to other times of day. Thus, even if guidance information G is displayed in the conditional region B2, since the pedestrian P is only briefly present, the guidance information G is not liable to obstruct the view and has little effect on driving. In this way, not only the permitted region B3 but also conditional regions B2 may be employed as display regions for the guidance information thereby enabling an efficient expansion of the region in which the guidance information G can be displayed compared to configurations in which the appearance frequency of targets T is not taken into account.

The present disclosure is not limited to the above exemplary embodiments.

Modified Example

Figure 10:
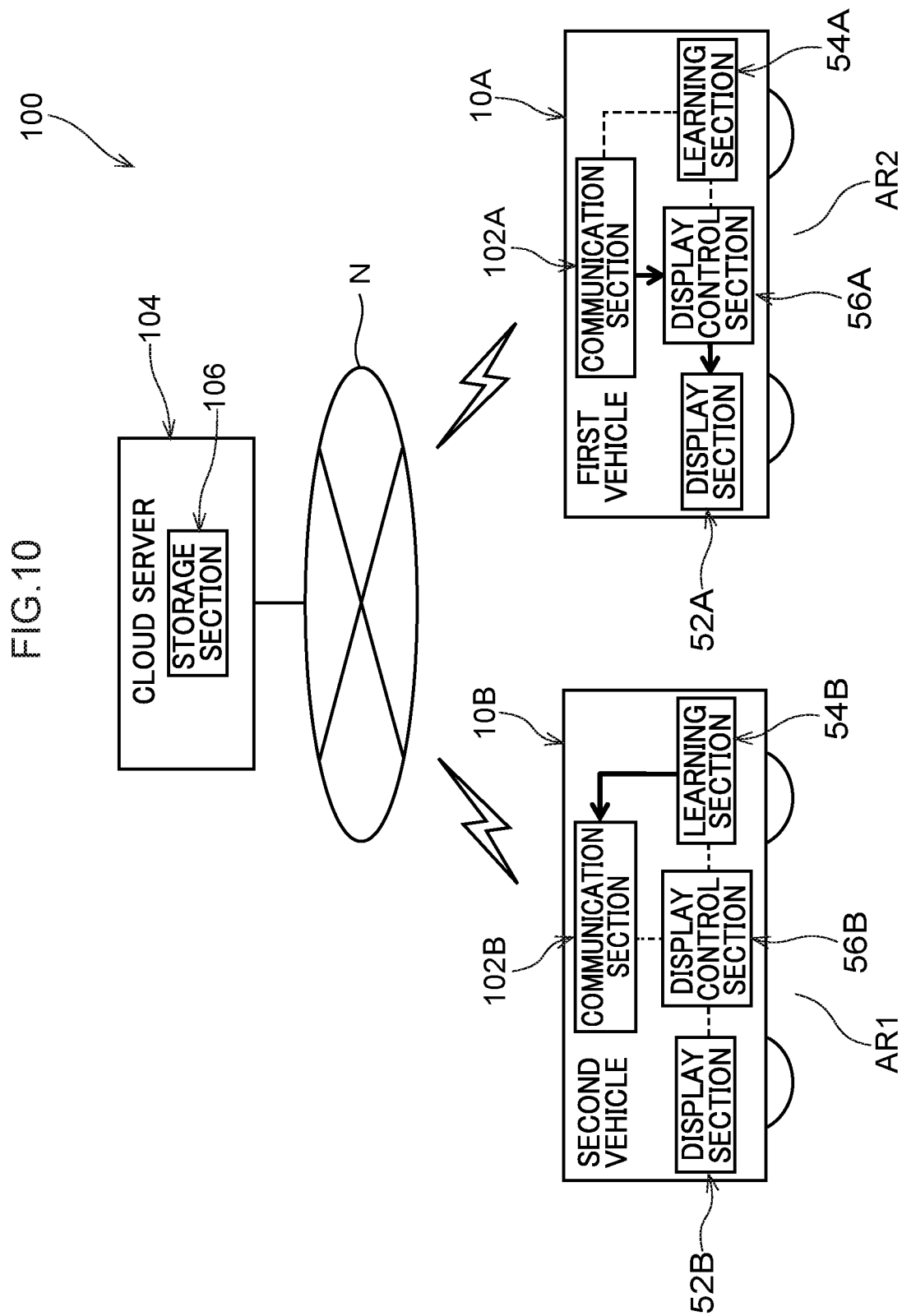
FIG. 10 is a diagram illustrating configuration of an information display system as a modified example of an information display device.

FIG. 10 illustrates an information display system 100 serving as a modified example of the information display device 20 (see FIG. 3) and the information display device 90 (see FIG. 7). Note that configurations that are similar to those of the information display device 20 and the information display device 90 are allocated the same reference numerals and explanation thereof is omitted.

Vehicles 10 are denoted a first (local) vehicle 10A and a second (another) vehicle 10B. While both the first vehicle 10A and the second vehicle 10B have matching configurations, these configurations are distinguished by appending an A to the reference numerals of the configurations of the first vehicle 10A, and appending a B to the reference numerals of the configurations of the second vehicle 10B.

The information display system 100 includes display sections 52A, 52B, learning sections 54A, 54B, display control sections 56A, 56B, communication sections 102A, 102B, and a cloud server 104. The communication sections 102A, 102B are configured similarly to the communication IF 44 (see FIG. 2). The communication section 102A and the communication section 102B are connected together so as to be capable of wireless communication through a network N. The cloud server 104 is also connected to the network N. The communication section 102A, the communication section 102B, and the cloud server 104 are thereby capable of communicating with each other through the network N.

A rewritable storage section 106 is provided in the cloud server 104. Learnt information learnt by the learning section 54A and the learning section 54B is stored in the storage section 106. As an example, the second vehicle 10B travels through an area AR1, and the learning section 54B learns the first targets T1, second targets T2, and third targets T3 present in the area AR1. The learnt information of the learning section 54B is stored in the storage section 106 via the communication section 102B and the network N.

Supposing that the first vehicle 10A traveling through an area AR2 is traveling toward the area AR1. The display control section 56A of the first vehicle 10A acquires the learnt information in the storage section 106 via the network N and the communication section 102A at the point in time when the first vehicle 10A reaches the area AR1. The display control section 56A then performs the processing of the display mode of the first exemplary embodiment or the second exemplary embodiment based on the acquired learnt information. In this manner, even if the first vehicle 10A has not performed learning in the area AR1, greater than necessary constraint on the display region of the guidance information G may be suppressed by employing the learnt information of the second vehicle 10B.

Note that the first vehicle 10A and the second vehicle 10B do not have to employ the same configuration as each other. For example, a learning-only vehicle that includes the communication section 102B and the learning section 54B but does not include a display control section 56B may be employed to perform learning. Learnt information learnt by the dedicated learning vehicle may be utilized to display guidance information G in a display-only vehicle that includes the communication section 102A, the display control section 56A, and the display section 52A but does not include a learning section 54A.

Other Modified Examples

In the information display device 20, configuration may be made such that the display of guidance information G is simply prohibited without repositioning from a conditional region B2 to the permitted region B3. Alternatively, in the information display device 20, configuration may be made such that the display of the guidance information G is simply prohibited without changing the display transparency level. Further, in the information display device 20, configuration may be made such that the display of guidance information G is simply prohibited without either repositioning the display or changing the transparency level.

In cases in which part of a prohibited region B1 and part of a conditional region B2 overlap each other, the prohibited region B1 may be prioritized.

As an example of a method of changing the viewing state of a second target T2 in the display section 52 as an alternative to the method in which the transparency level of the guidance information G is changed, the color in which the guidance information G is displayed may be changed. In cases in which the display color of the guidance information G is changed, a color detection section may be provided to detect the color of second target T2, and a color that makes the second target T2 easier to see and a color that makes the second target T2 more difficult to see may be set based on color information obtained by the color detection section.

Separate storage sections 72 may be respectively provided to the learning section 54 and the display control section 56.

As another example of a method to display guidance information G on the display section 52, an intermediate film capable of emitting light may be provided within front glass with a dual layered structure, and a laser beam shone onto the intermediate film so as to emit light and perform the display. Alternatively, a display may be disposed on the vehicle cabin 12 side of the front glass 14, and the guidance information G displayed on this display.

Note that the learning processing and display control processing executed by the CPU 23 reading and executing software (a program) in the above exemplary embodiments may be executed by various types of processors other than the CPU 23. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The learning processing and display control processing may be executed by any one of these various types of processor, or executed by a combination of two or more of the same type or different types of processor (such as plural FPGAs, or a combination of a CPU and an FPGA). The hardware structure of these various types of processors is more specifically an electric circuit combining circuit elements such as semiconductor elements.

In the above exemplary embodiments, the learning program and the display control program are each in a format pre-stored (installed) in the ROM 24 or the storage 26. However, there is no limitation thereto. Each program may be provided in a format recorded on a recording medium such as compact disc read only memory (CD-ROM), digital versatile disc read only memory (DVD-ROM), or universal serial bus (USB) memory. Alternatively, the learning program and the display control program may each be provided in a format downloadable from an external device through a network.

What is claimed is:

1. An information display device comprising:
   a display section that is provided to a vehicle, and that is configured to display a view of a situation ahead of the vehicle to be viewed and to display guidance information;
   a memory; and
   a processor that is coupled to the memory and that is configured to:
      learn and classify targets appearing on a travel route of the vehicle and visible through the display section as:
         a first target that is necessary to be visible regardless of a setting condition,
         a second target that is necessary to be visible under the setting condition, the setting condition being a condition that the target visible through the display section at a current segment of the travel route is still present in a next segment of the travel route that is ahead of the current segment by a predetermined distance, or
         a third target that is not necessary to be visible, and
      perform display control including:
         prohibiting display of the guidance information in a prohibited region of the display section in which the first target is present,
         permitting display of the guidance information in a permitted region of the display section in which the third target is present, and
         either prohibiting display of the guidance information in a conditional region of the display section in which the second target is present in a case in which the setting condition is met, or permitting display of the guidance information in the conditional region in a case in which the setting condition is not met.

2. The information display device of claim 1, wherein the display control further includes repositioning display of the guidance information from the conditional region to the permitted region in a case in which the conditional region continues in a next segment of the travel route.

3. The information display device of claim 1, wherein the display section is configured to change a display transparency level of the guidance information, and
   the display control further includes, in a case in which the conditional region will no longer be present in a next segment of the travel route, displaying the guidance information in the conditional region with the display transparency level of the guidance information raised in comparison to the display transparency level of the guidance information when displayed in the next segment of the travel route.

4. The information display device of claim 1, wherein the processor is further configured to:
   learn time-of-day information indicating a time when at least the second target appears, and a reduced frequency time-of-day indicating a time when a frequency of appearance of the second target is reduced compared to the frequency of appearance of the second target at other times of day, the reduced frequency time-of-day being included in a condition for a case in which the setting condition is not met; and
   the display control further includes permitting display of the guidance information in the conditional region at the reduced frequency time-of-day.

5. The information display device of claim 1, wherein the second target comprises a moving object including at least one of another vehicle or a pedestrian.

6. The information display device of claim 1, wherein the processor is configured to learn and classify the targets appearing on the travel route of the vehicle and visible through the display section as the second target that is necessary to be visible under the setting condition, and display of the guidance information in the conditional region of the display section in which the second target is present is prohibited in the case in which the setting condition is met.

7. A control method of an information display device including a display section provided to a vehicle and configured to display a view of a situation ahead of the vehicle and to display guidance information, the control method comprising:

learning and classifying targets appearing on a travel route of the vehicle and visible through the display section as:
- a first target that is necessary to be visible regardless of a setting condition,
- a second target that is necessary to be visible under the setting condition, the setting condition being a condition that the target visible through the display section at a current segment of the travel route is still present in a next segment of the travel route that is ahead of the current segment by a predetermined distance, or
- a third target that is not necessary to be visible; and
performing display control that includes:
prohibiting display of the guidance information on the display section in a prohibited region of the display section in which the first target is present,
permitting display of the guidance information on the display section in a permitted region of the display section in which the third target is present, and
either prohibiting display of the guidance information in a conditional region of the display section in which the second target is present in a case in which the setting condition is met, or permitting display of the guidance information in the conditional region in a case in which the setting condition is not met.

8. A non-transitory storage medium storing a program that causes a computer to execute control processing of an information display device, the information display device comprising a display section provided to a vehicle and configured to display a view of a situation ahead of the vehicle and to display guidance information, the control processing comprising:

learning and classifying targets appearing on a travel route of the vehicle and visible through the display section as:
- a first target that is necessary to be visible regardless of a setting condition,
- a second target that is necessary to be visible under the setting condition, the setting condition being a condition that the target visible through the display section at a current segment of the travel route is still present in a next segment of the travel route that is ahead of the current segment by a predetermined distance, or
- a third target that is not necessary to be visible; and
performing display control including:
prohibiting display of the guidance information on the display section in a prohibited region of the display section in which the first target is present,
permit displaying of the guidance information on the display section in a permitted region of the display section in which the third target is present, and
either prohibiting display of the guidance information in a conditional region of the display section in which the second target is present in a case in which the setting condition is met, or permitting display of the guidance information in the conditional region in a case in which the setting condition is not met.

* * * * *